US012204260B2

(12) United States Patent
Zampell et al.

(10) Patent No.: US 12,204,260 B2
(45) Date of Patent: Jan. 21, 2025

(54) DEVELOPER ROLLER

(71) Applicant: Hewlett-Packard Development Company, L.P., Spring, TX (US)

(72) Inventors: Jeffrey Zampell, San Diego, CA (US); Daniel C. Tanchangco, San Diego, CA (US); Jingzhi Lu, San Diego, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/249,088

(22) PCT Filed: Oct. 16, 2020

(86) PCT No.: PCT/US2020/056119
§ 371 (c)(1),
(2) Date: Apr. 14, 2023

(87) PCT Pub. No.: WO2022/081176
PCT Pub. Date: Apr. 21, 2022

(65) Prior Publication Data

US 2023/0400790 A1 Dec. 14, 2023

(51) Int. Cl.
*G03G 15/10* (2006.01)
*G03G 15/08* (2006.01)
*G03G 15/11* (2006.01)

(52) U.S. Cl.
CPC ......... *G03G 15/0818* (2013.01); *G03G 15/11* (2013.01)

(58) Field of Classification Search
CPC ........................... G03G 15/11; G03G 15/0818
USPC ......................................... 399/152, 258, 279
See application file for complete search history.

(56) References Cited

U.S. PATENT DOCUMENTS

| | | | |
|---|---|---|---|
| 5,132,050 | A | 7/1992 | Baker et al. |
| 8,852,621 | B2 | 10/2014 | Patel et al. |
| 8,971,754 | B2 | 3/2015 | Abe et al. |
| 2007/0003329 | A1 | 1/2007 | Kim |
| 2013/0272755 | A1 | 10/2013 | Takeuchi et al. |
| 2019/0332037 | A1 | 10/2019 | Sabo et al. |
| 2020/0073309 | A1 | 3/2020 | Matsunaga et al. |

FOREIGN PATENT DOCUMENTS

| | | | |
|---|---|---|---|
| CN | 202837820 | U | 3/2013 |
| CN | 103314330 | A | 9/2013 |
| CN | 111522214 | A | 8/2020 |
| JP | 2004-191430 | A | 7/2004 |
| JP | 3982122 | B2 | 9/2007 |
| JP | 2012-128335 | A | 7/2012 |
| JP | 2020034794 | * | 3/2020 |
| JP | 2020-126131 | A | 8/2020 |
| KR | 10-0683180 | B1 | 2/2007 |
| KR | 20100024422 | * | 3/2010 |

* cited by examiner

*Primary Examiner* — Hoan H Tran
(74) *Attorney, Agent, or Firm* — Jordan IP Law, LLC

(57) ABSTRACT

A developer roller having a first section that includes a first exterior surface, wherein the first exterior surface includes an electrically-conductive material; and a second section includes a second exterior surface, wherein the second exterior surface is non-electrically-conductive. The second section is axially aligned with the first section and provided at a first longitudinal end of the first section.

11 Claims, 4 Drawing Sheets

DEVELOPER ROLLER

BACKGROUND

In electrostatic printers, electrically-conductive developer rollers are electrically charged by an electrode within a binary ink developer. To enhance printing fluid transfer to and from the developer roller, a non-electrically-conductive coating is provided on a surface of the developer roller. As the coating dries on the surface, it can begin to retract from longitudinal ends of the developer roller. This can expose longitudinal end portions of the surface of the developer roller to the electrode. Subsequently, electrical breakdown (also known as arcing) can occur between the longitudinal end portions of the surface and the electrode, which can cause the developer roller to begin to melt and suffer gelation. This gelation can lead to printing fluid splashing during use, which can result in undesirable inconsistencies in a printing process.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In certain liquid electrophotographic printers, a transfer element is used to transfer developed liquid printing fluid (e.g. ink) to a print medium. For example, a developed image, comprising liquid printing fluid aligned according to a latent image, may be transferred from a photo imaging plate (PIP) to a transfer blanket of a transfer cylinder and from the transfer blanket to a desired substrate, which is placed into contact with the transfer blanket. At least two different methodologies may be used to print multi-color images on a liquid electrophotographic printer. Both methodologies involve the generation of multiple separations, where each separation is a single-color partial image. When these separations are superimposed it can result in the desired full color image being formed. In a first methodology, a color separation layer is generated on the PIP, transferred to the transfer cylinder and is finally transferred to a substrate. Subsequent color separation layers are similarly formed and are successively transferred to the substrate on top of the previous layer(s). This is sometimes known as a "multi-shot color" imaging sequence. In a second methodology, a "one shot color" process is used. In these systems, the PIP transfers a succession of separations to the transfer blanket on the transfer cylinder, building up each separation layer on the blanket. Once some number of separations are formed on the transfer blanket, they are all transferred to the substrate together. Both methodologies result in a full color image being formed.

In some electrophotographic printers, an image development unit (such as a binary ink developer (BID)) comprises printing fluid (e.g. liquid ink) which is to be transferred to the PIP. Liquid ink comprises ink particles and a carrier liquid. More than one image development unit can be used, each image development unit comprising different coloured printing fluid. The printing fluid or pigment particles are charged and may be arranged upon the PIP based on a charge pattern of a latent image. Once liquid printing fluid is applied to the latent image on the PIP, an image is formed on the PIP. When the printing fluid is ink, the image comprises ink particles that are aligned according to the latent image.

Figure 1:
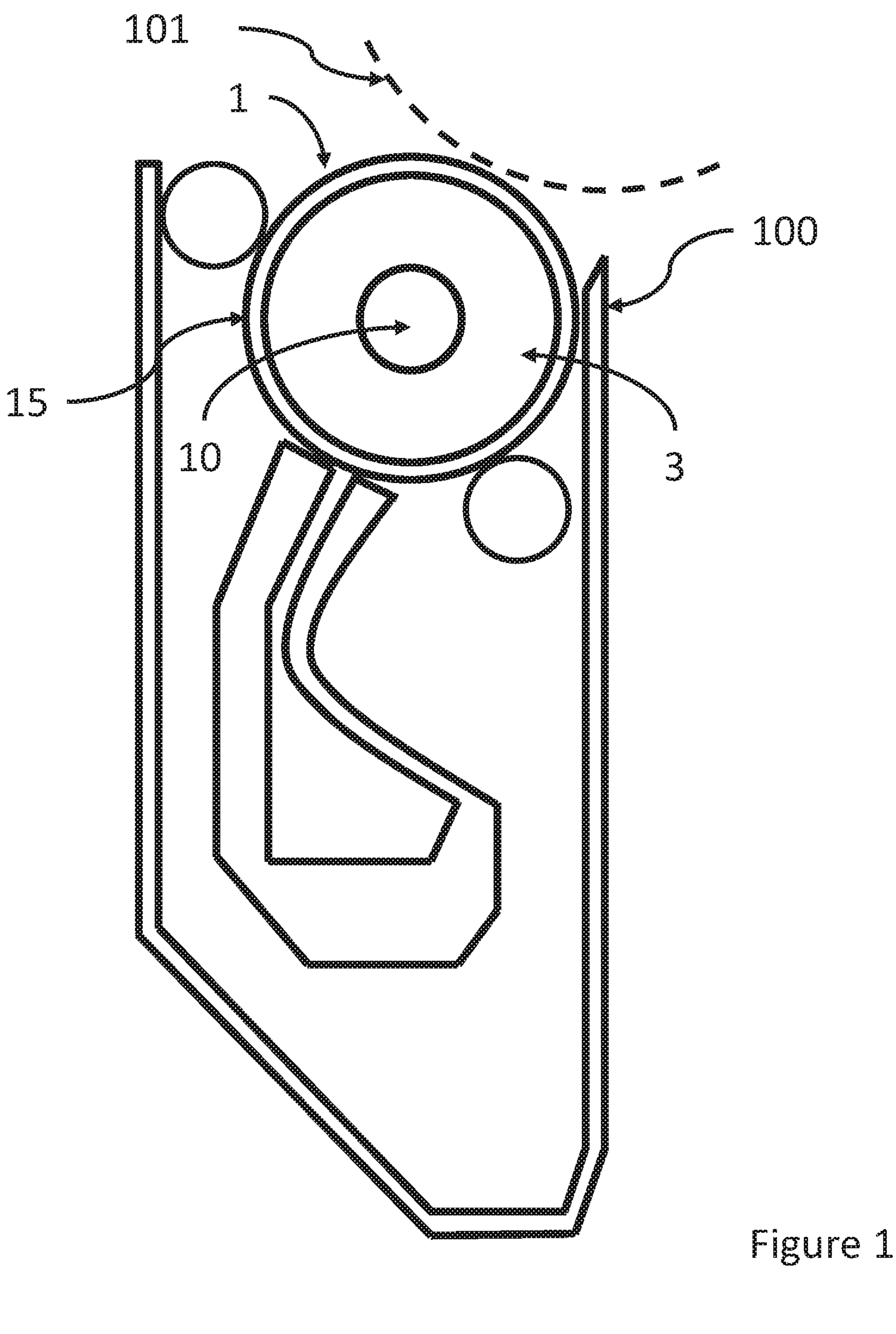
FIG. 1 shows a schematic view of an example image development unit.
Figure 2:
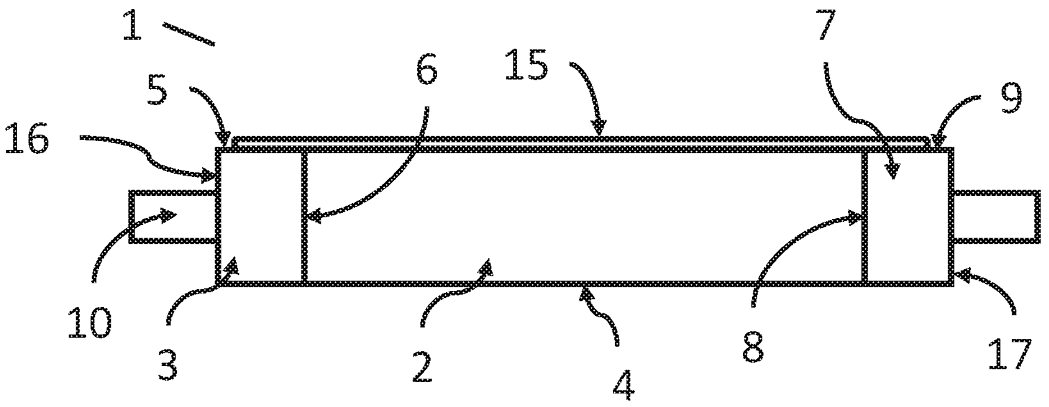
FIG. 2 shows a schematic view of an example developer roller.

FIG. 1 shows an example image development unit 100. The image development unit 100 of FIG. 1 is a part of an electrophotographic printer and is movably connected or connectable to a PIP 101. As shown in FIG. 1, the image development unit 100 is in the form of a BID 100 comprising a developer roller 1 (as shown in FIG. 2) which contacts the PIP 101 to transfer printing fluid (e.g. ink) during a print. In other examples, the image development unit 100 could take a different form.

FIG. 2 shows an example developer roller (or roller) 1. The developer roller 1 is for use in the image development unit 100 of FIG. 1. Like reference numerals in FIGS. 1 and 2 indicate like features. The developer roller 1 comprises a first section 2 and a second section 3. In the example shown in FIG. 2, the first section 2 and the second section 3 are cylindrical. The first section 2 comprises a first exterior surface 4, the first exterior surface 4 comprising an electrically-conductive material. In some examples, the first section 2 is also referred to as an electrically-conductive section. The second section 3 comprises a second exterior surface 5, wherein the second exterior surface 5 is non-electrically conductive. For example, the second exterior surface 5 is made entirely of a non-electrically-conductive material. In the example shown in FIG. 2, the first exterior surface 4 and the second exterior surface 5 are circumferential surfaces of the first section 2 and the second section 3 respectively. In some examples, the second section 3 is also referred to as a non-electrically conductive cap. In the example of FIG. 2, the second exterior surface 5 comprises the non-electrically-conductive material. In other examples, the second section 3 is made entirely of the non-electrically-conductive material. In the example of FIG. 2, the non-electrically-conductive material is polyurethane or rubber. In other examples, other non-electrically-conductive materials are used. As shown in FIG. 2, the second section 3 is axially aligned with the first section 2 and is provided at a first longitudinal end 6 of the first section 2.

In the example shown in FIG. 2, the developer roller 1 comprises a third section 7 which is axially aligned with the first section 2 and is provided at a second longitudinal end 8 of the first section 2. In this way, the first section 2 can be considered a middle section. The third section comprises a third exterior surface 9 which is non-electrically conductive. In the example of FIG. 2, the third section 7 is the same as the first section 3. For example, the third section 7 has the same dimensions and comprises the same material as the second section 3. In other examples, the third section 7 has difference properties to the second section 3. For example, the third section 7 may comprise a different material or have a different dimension to the second section 3. In some examples, the third section 7 is also referred to as a non-electrically conductive cap. As shown in FIG. 2, the second section 3 at least partially defines a first longitudinal end 16 of the developer roller 1. The third section 7 at least partially defines a second longitudinal end 17 of the developer roller 1. The second longitudinal end 17 of the developer roller 1 is opposite the first longitudinal end 16 of the developer roller 1. Alternatively, the third section 7 is omitted.

In the example shown in FIG. 2, the first section 2 is formed on the second section 3. For example, the second section 3 is formed in a mold (as discussed later) and the first section is subsequently formed on the second section 3. For example, once the second section 3 is formed, the first section 2 can be applied in non-solid form to the second section 3, such that when the first section 2 sets, the first section 2 is attached to the second section 3. In this example, the first section 2 is formed onto the third section 7 in the same way. In other examples, the first section 2 is attached to the second section 3 and the third section 7 in any other suitable way. For example, an adhesive can be used to attach the first section 2 to the second section 3 and the third section 7. In some examples, the first section 2 and/or the third section 7 are formed on the second section 3. In some examples, there may be a blend in material between the first section 2 and the second section 3, or the first section 2 and the third section 7, when the first section 2 is formed on the second section 3 or third section 7. Such a blend may occur due to the materials of the respective sections diffusing into each other before the sections have fully set.

Figure 3:
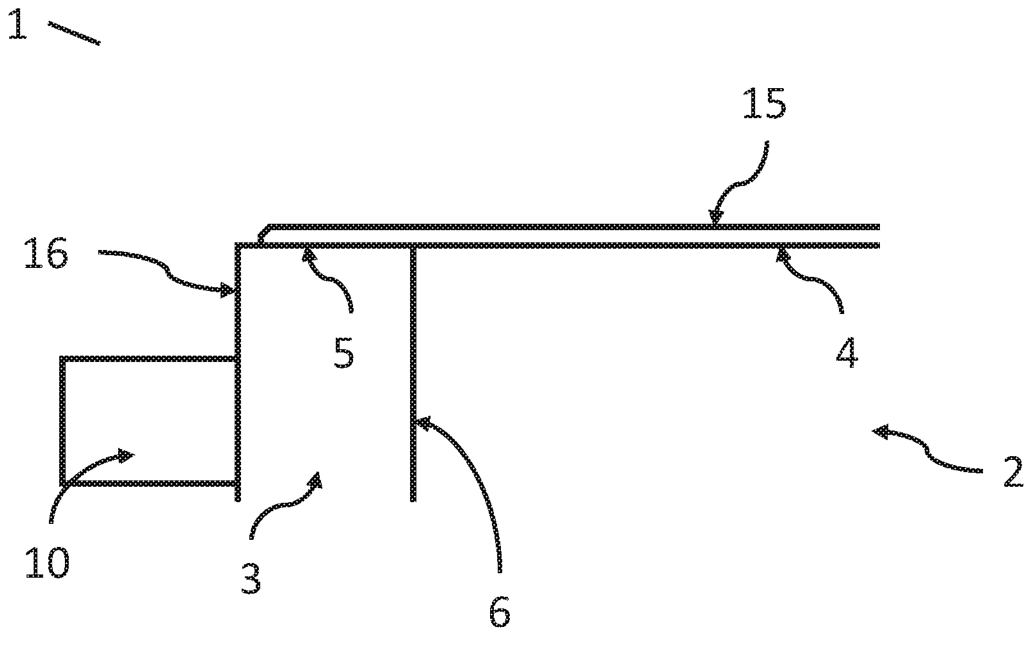
FIG. 3 shows a schematic close-up view of part of the developer roller of FIG. 1.

FIG. 3 shows a closer view of a part of the developer roller 1 of FIG. 2. As shown in FIG. 3, the developer roller 1 comprises a non-electrically-conductive coating 15 (or layer) on the first exterior surface 4 and the second exterior surface 5. In the example shown in FIG. 2, the coating 15 is also provided on the third exterior surface 9. In other examples, the coating 15 is provided on at least the first exterior surface 4. For example, in some examples, the coating 15 is provided on the first exterior surface 4 but not the second exterior surface 5 or the third exterior surface 9. In other examples, the coating 15 is provided on the first exterior surface 4 and on at least a part of the second exterior surface 5 and/or on at least a part of the third exterior surface 9. In the example of FIGS. 2 and 3, the coating 15 comprises polyurethane. In other examples, the coating 15 comprises any other suitable material. In the example shown in FIG. 3, the coating 15 is retracted from the first longitudinal end 16 and from the second longitudinal end 17 of the developer roller 1. In other examples, the coating 15 extends fully across the second exterior surface 5 to the first longitudinal end 16 of the developer roller 1. The coating 15 helps with the release of printing fluid from the developer roller 1 and also helps to control the electrical-conductivity of the developer roller 1. For example, the coating 15 has a formulation that comprises a component to balance adhesion and release of the printing fluid. In some examples, the electrical-conductivity of the developer roller 1 is determined by a thickness of the coating 15. In the example shown in FIGS. 2 and 3, the coating 15, the second exterior surface 5 and the third exterior surface 9 together define an overall circumferential surface of the developer roller 1. In other examples where the coating 15 covers the first exterior surface 4, the second exterior surface 5 and the third exterior surface 9 in full (i.e. extends from the first longitudinal end 16 of the developer roller 1 to the second longitudinal end 17 of the developer roller 1), the coating 15 defines the overall circumferential surface of the developer roller 1.

As discussed above, as the coating 15 applied to the developer roller 1 dries, it can retract from the longitudinal ends 16, 17 of the developer roller 1. As shown in FIG. 3, this causes a part of the second exterior surface 5 to be exposed at a circumferential surface of the developer roller 1 in use. However, as the second exterior surface 5 is non-electrically conductive, when the developer roller 1 is provided in an electrostatic print apparatus, arcing is less likely to occur between an electrode of the print apparatus and the second exterior surface 5. As such, the second exterior surface 5 is less likely to soften and melt in use and the chance of gelation is reduced, increasing print consistency of the print apparatus. The same effect can also occur at the third exterior surface 9 as discussed above in relation to the second exterior surface 5.

As shown in FIG. 2, the developer roller 1 comprises a rod 10 which passes through a center of each of the first section 2, the second section 3 and the third section 7. In the example shown in FIG. 1, the developer roller 1 is to rotate about a longitudinal axis of the rod 10 in use.

In some examples, such as the present example, the first exterior surface 4, the second exterior surface 5 and the third exterior surface 9 (when provided) comprise the same base material. For example, the first exterior surface 4, the second exterior surface 5 and the third exterior surface 9 comprise rubber or polyurethane. In this example, the first exterior surface 4 also comprises electrically-conductive material, while the second exterior surface 5 and the third exterior surface 9 are substantially free of electrically-conductive material. In other examples, the first exterior surface 4, the second exterior surface 5 and the third exterior surface 9 comprise any other suitable material.

Figure 4:
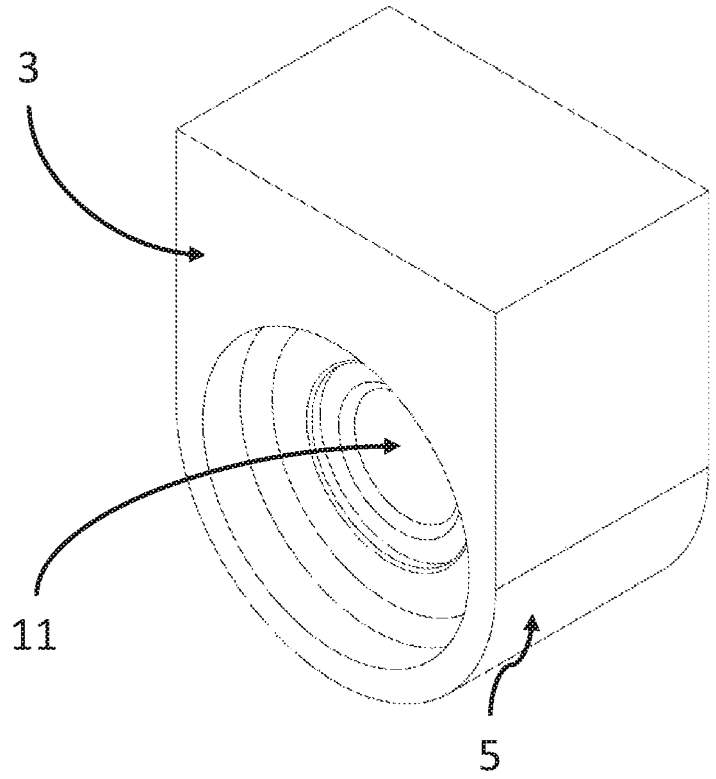
FIG. 4 shows a schematic view of an example cap.

FIG. 4 shows an example of the second section 3 (or cap) discussed above, before any processing of the second exterior surface 5 has occurred. The second section 3 comprises an aperture 11 which is to receive the rod 10. The second exterior surface 5 of the second section 3 is non-electrically-conductive. In some examples, the second section 3 is made entirely of a non-electrically conductive material. In other examples, the second exterior surface 5 is non-electrically-conductive while a part of the second section 3 away from the second exterior surface 5 is electrically-conductive. The third section 7 is substantially the same as the second section 3 and has the same properties as discussed above.

Figure 5:
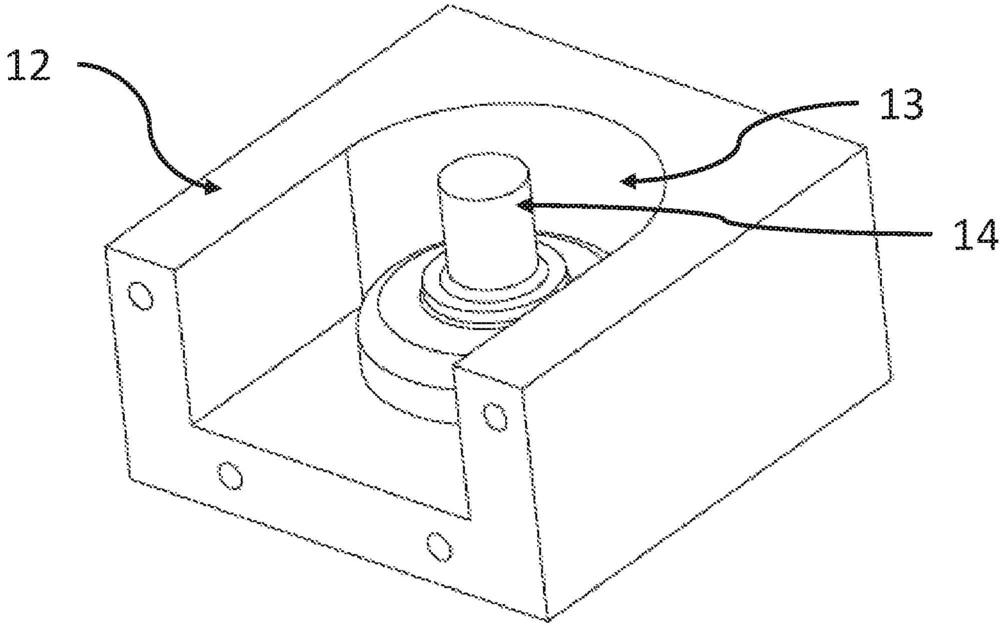
FIG. 5 shows a schematic view of an example cap mold.

FIG. 5 shows a mold 12 used to form the second section 3 (or cap) shown in FIG. 2. The use of a mold 12, such as that shown in FIG. 5, allows the second section 3 (or end cap) to be pre-produced separately from the first section 2. As shown in FIG. 5, the mold 12 comprises a space 13 into which the material used to form the second section 3 is inserted. Although the space 13 is shown having an elongate "D" profile in FIG. 5, other shaped profiles can also be used. In one example, the space 13 has a circular profile. The mold 12 also comprises a shaped protrusion 14 which corresponds to the aperture 11 of the second section 3. In some examples, the mold 12 as shown in FIG. 5 is also used to form the third section 7.

Although it is discussed above that the second section 3 is formed using a mold 12, in other examples, other manufacturing methods are used. In some examples, the second section 3 and/or third section 7 are formed using a three-dimensional printer. In other examples, other forms of computer-aided manufacturing can be used, for example using computer numerical control (CNC) machines.

Figure 6:
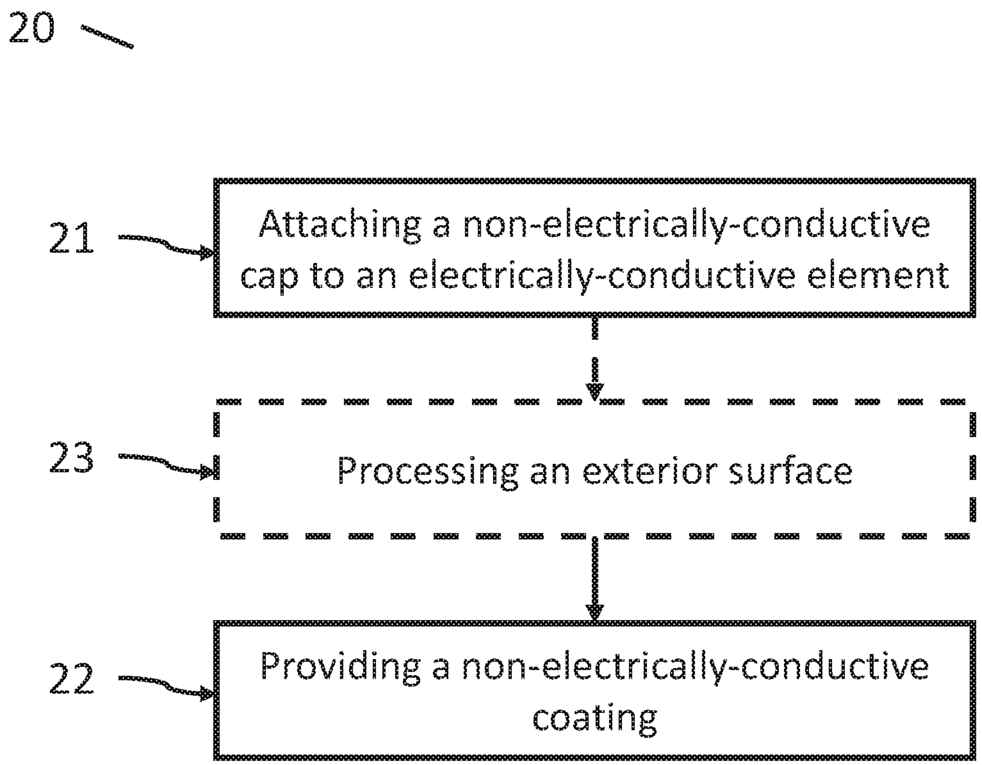
FIG. 6 shows a flow chart of an example method.

FIG. 6 shows a flow chart of a method 20 of making a developer roller 1 for a print apparatus according to one example. The method 20 comprises attaching 21 a non-electrically-conductive cap to an electrically-conductive element, such that the electrically-conductive element and the cap are axially aligned, to form a subassembly. The method 20 also comprises providing 22 a non-electrically-conductive coating on an exterior surface of the subassembly, the exterior surface being defined in part by the element and in part by the cap.

In some examples, the subassembly is the developer roller 1 (or roller) described above in relation to FIG. 2. For example, the electrically-conductive element is equivalent to the first section 2 and the cap is equivalent to the second section 3 and/or third section 7.

As shown in FIG. 6, the method 20 also comprises processing 23 the exterior surface of the subassembly to create a substantially uniform surface. In this example, the processing 23 occurs before the providing 22 the non-conductive coating. In the example of FIG. 6, the processing 23 comprises grinding the exterior surface such that the subassembly has a substantially circular cross-section. In other examples, other processes can be used that result in a substantially circular cross-section of the subassembly, such as milling or filing. The developer roller 1 shown in FIG. 2 has a substantially cylindrical shape with a circular cross-section. In the example of FIG. 2, the developer roller 1 is initially formed with a non-circular cross-section and is processed to have a circular cross-section, for example by grinding the first exterior surface 4, the second exterior surface 5 and the third exterior surface 9. In other examples, the developer roller 1 is formed with a circular cross-section without the need for further processing to alter the cross-sectional shape of the developer roller 1.

As discussed above, the first section 2, the second section 3 and the third section 7 comprise the same base material. Electrically-conductive material is added to the first exterior surface 4 such that the first exterior surface 4 is electrically-conductive. No electrically-conductive material is added to the second exterior surface 5 and the third exterior surface 9, such that the second exterior surface 5 and the third exterior surface 9 are non-electrically-conductive.

As shown in FIG. 1, the image development unit 100 comprises the developer roller 1 (or roller) as discussed in any of the above examples. In some examples, the image development unit 100 is a binary ink developer. In other examples, a print apparatus, such as a liquid electrographic printer, comprises the image development unit 100.

As discussed in the examples above, a developer roller 1 (or roller) is provided which helps to reduce the chance of the developer roller 1 melting in use by providing sections of non-electrically-conductive material at the longitudinal ends 16, 17 of the developer roller 1. The non-electrically-conductive sections reduce the chance of arcing occurring between an electrode and the developer roller 1 in use, to reduce the change of the developer roller 1 melting. This helps to reduce the chance of development roller 1 becoming damaged, therefore increasing the lifetime of the developer roller 1 while also improving print quality and/or consistency.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A developer roller comprising:

a first section comprising a first exterior surface, wherein the first exterior surface comprises an electrically-conductive material and a non-electrically-conductive coating is provided on the first exterior surface comprising the electrically-conductive material; and a second section comprising a second exterior surface, wherein the second exterior surface is non-electrically-conductive, wherein the second section is axially aligned with the first section and provided at a first longitudinal end of the first section.

2. The developer roller according to claim 1, wherein the second exterior surface comprises polyurethane.

3. The developer roller according to claim 1, wherein the coating comprises polyurethane.

4. The developer roller according to claim 1, wherein the coating is also provided on at least part of the second exterior surface.

5. The developer roller according to claim 1, wherein the second section consists entirely of the non-electrically-conductive material.

6. The developer roller according to claim 1, wherein the second section at least partially defines a first longitudinal end of the developer roller.

7. The developer roller according to claim 6, comprising a third section, wherein the third section is axially aligned with the first section and provided at a second longitudinal end of the first section, opposite the first longitudinal end of the first section, and wherein the third section at least partially defines a second longitudinal end of the developer roller, opposite the first longitudinal end of the developer roller.

8. The developer roller according to claim 1, comprising a third section comprising a third exterior surface, wherein the third exterior surface is non-electrically-conductive, and wherein the third section is axially aligned with the first section and provided at a second longitudinal end of the first section, opposite the first longitudinal end of the first section.

9. An image development unit comprising:

the developer roller according to claim 1.

10. A roller for use in an electrostatic print apparatus, the roller comprising:

an electrically-conductive section, wherein a non-electrically conductive layer is provided on an exterior surface of the electrically-conductive section; and a non-electrically conductive cap at a longitudinal end of the electrically conductive section.

11. The roller according to claim 10, wherein the non-electrically conductive cap defines part of an exterior surface of the roller.

* * * * *